United States Patent
Koga

(10) Patent No.: US 9,552,041 B2
(45) Date of Patent: Jan. 24, 2017

(54) SYSTEM, METHOD AND NON-TRANSITORY COMPUTER-READABLE MEDIUM FOR CONTROLLING POWER SUPPLY IN RESPONSE TO RECEIPT OF DATA OVER A NETWORK

(71) Applicant: CANON KABUSHIKI KAISHA, Tokyo (JP)

(72) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 14/546,444

(22) Filed: Nov. 18, 2014

(65) Prior Publication Data

US 2015/0185821 A1 Jul. 2, 2015

(30) Foreign Application Priority Data

Dec. 27, 2013 (JP) .................................. 2013-273164

(51) Int. Cl.
 *G06F 1/32* (2006.01)
 *H04L 29/08* (2006.01)

(52) U.S. Cl.
 CPC ........... *G06F 1/3209* (2013.01); *G06F 1/3296* (2013.01); *H04L 67/02* (2013.01); *H04L 67/025* (2013.01)

(58) Field of Classification Search
 CPC .............................. G06F 1/3206; G06F 1/3209
 USPC ........................................................ 713/323
 See application file for complete search history.

(56) References Cited

U.S. PATENT DOCUMENTS

| 5,802,305 | A  | * | 9/1998  | McKaughan | G06F 1/3209 |
|           |    |   |         |           | 709/227     |
| 7,324,518 | B2 | * | 1/2008  | Dai       | H04L 12/12  |
|           |    |   |         |           | 370/392     |
| 7,447,927 | B2 |   | 11/2008 | Siegmund  |             |
| 7,765,413 | B2 | * | 7/2010  | Senda     | H04N 1/00127|
|           |    |   |         |           | 713/300     |
| 7,899,923 | B2 |   | 3/2011  | Siegmund  |             |
| 8,077,712 | B2 | * | 12/2011 | Evans     | H04L 12/12  |
|           |    |   |         |           | 370/389     |
| 8,190,927 | B2 | * | 5/2012  | Fukuda    | G06F 1/3203 |
|           |    |   |         |           | 713/300     |
| 8,539,090 | B2 |   | 9/2013  | Siegmund  |             |

(Continued)

FOREIGN PATENT DOCUMENTS

| JP | 2009-504083 A  | 1/2009 |
| WO | 2007/024306 A1 | 3/2007 |

*Primary Examiner* — Chun Cao
(74) *Attorney, Agent, or Firm* — Fitzpatrick, Cella, Harper & Scinto

(57) ABSTRACT

In a system, an apparatus determines whether or not an information processing apparatus needs to return to a normal power supply mode, in response to reception of a first packet related to a job through a network, determines whether or not cooperation with another apparatus is needed in order to process the job related to the first packet if it is determined that the information processing apparatus needs to return to the normal power supply mode, generates a second packet for causing the another apparatus in a power saving mode to return to the normal power supply mode, sends the second packet to the another apparatus, if it is determined that cooperation with another apparatus is needed, and causes the information processing apparatus to return from a power saving mode to the normal power supply mode after the second packet is sent.

17 Claims, 7 Drawing Sheets

(56) References Cited

U.S. PATENT DOCUMENTS

| | | | |
|---|---|---|---|
| 8,614,820 B2* | 12/2013 | Kamei | G06F 3/1221 |
| | | | 358/1.15 |
| 2005/0066022 A1* | 3/2005 | Liebenow | H04L 12/12 |
| | | | 709/223 |
| 2007/0050645 A1 | 3/2007 | Siegmund | |
| 2009/0030970 A1 | 1/2009 | Siegmund | |
| 2009/0228695 A1* | 9/2009 | Pathak | G06F 1/3203 |
| | | | 713/1 |
| 2011/0119512 A1 | 5/2011 | Siegmund | |
| 2012/0246502 A1* | 9/2012 | Koga | H04N 1/00896 |
| | | | 713/323 |

* cited by examiner

FIG. 5

| ID | Caller Tel Number | Transport Tel Number |
|---|---|---|
| 1 | 050-123-4567 | 050-987-6543 |
| 2 | 050-456-7890 | 050-765-4321 |
| 3 | 050-456-7890 | 050-432-1098 |

FIG. 6

| ID | Caller IP Address | Transport IP Address |
|---|---|---|
| 1 | 192.169.001.123 | 192.167.012.234 |
| 2 | 192.200.010.064 | 192.167.023.210 |
| 3 | 192.200.010.064 | 192.167.008.090 |

FIG. 7

| ID 701 | Src IP Address (Recv) 702 | Dest Port (Recv) 703 | Protocol No (Recv) 704 | Dest IP Address (Send) 705 | Dest Port (Send) 706 | Protocol No (Send) 707 |
|---|---|---|---|---|---|---|
| 1 | 192.169.001.123 | 5060 | 17(UDP) | 192.167.012.234 | 9100 | 17(UDP) |
| 2 | 192.200.010.064 | 5060 | 17(UDP) | 192.167.023.210 | 9100 | 17(UDP) |
| 3 | 192.200.010.064 | 5060 | 17(UDP) | 192.167.008.090 | 9100 | 17(UDP) |
| 4 | 192.201.234.210 | 161 | 17(UDP) | 192.201.234.012 | 161 | 17(UDP) |

| PortNo 801 | Printing JOB 802 |
|---|---|
| 161 | No |
| 515 | Yes |
| 5060 | Yes |
| 9100 | Yes |

800

SYSTEM, METHOD AND NON-TRANSITORY COMPUTER-READABLE MEDIUM FOR CONTROLLING POWER SUPPLY IN RESPONSE TO RECEIPT OF DATA OVER A NETWORK

BACKGROUND OF THE INVENTION

Field of the Invention

The present invention relates to systems and methods for controlling the same, network interface apparatuses and methods for controlling the same, and non-transitory computer readable medium.

Description of the Related Art

Conventionally, image forming apparatuses, such as a multi-function peripheral, a single-function printer, etc., that have a sleep mode (power saving mode) in which power consumption is less than in a standby mode (normal power supply mode), have become increasingly popular. In the sleep mode, power is not supplied to units except a random access memory (RAM), a network interface card (NIC), and an operation unit, whereby power consumption in the sleep mode is reduced to about one to several watts. Note that, in the sleep mode, power is also not supplied to a photoconductive drum or fixing unit included in a printer unit of the image forming apparatus, or a central processing unit (CPU) or a hard disk drive (HDD). Therefore, in the sleep mode, the functions of the image forming apparatus are limited, and the image forming apparatus cannot perform an image forming process.

On the other hand, when a predetermined condition is satisfied in the sleep mode, the image forming apparatus returns (resumes) from the sleep mode to the standby state. The predetermined condition is, for example, (1) the user has performed an operation on the operation unit of the image forming apparatus; (2) the NIC has received, through a network, a packet which satisfies a condition for returning from the sleep mode; etc. Therefore, power is supplied to the operation unit and the NIC even in the sleep mode to monitor pressing down of buttons included in the operation unit, reception of packets, etc. Japanese Patent Laid-Open No. 2009-504083 describes an example technique of allowing an apparatus to return from the sleep mode, in which a target which is located in a target LAN and is to be returned from the sleep mode is caused to return using a remote system through a relay agent.

Incidentally, some recent image forming apparatuses have a function of performing a job in cooperation with another image forming apparatus, i.e., a plurality of image forming apparatuses perform a job in cooperation with each other. For example, in the case of the fax reception and transfer function, image forming apparatuses perform a job in cooperation with each other. The reception and transfer function indicates that one apparatus (represented by B) which has received fax data from another image forming apparatus (represented by A) does not print the fax data on its own, and transfers the received fax data to still another image forming apparatus (represented by C) in accordance with reception and transfer settings set in the image forming apparatus B. In other words, the image forming apparatus B which has received the fax data does not perform a printing process and only transfers the fax data, while the image forming apparatus C which has received the transferred fax data performs a printing process. In recent years, an image forming apparatus which performs fax communication called IP-fax using an IP network has also become increasingly widespread.

When image forming apparatuses having the sleep mode are used to receive and transfer an IP-fax, there may be a situation in which a first image forming apparatus which first receives an IP-fax is in the sleep mode while a second image forming apparatus which is a transfer destination is also in the sleep mode. In this case, initially, the first image forming apparatus which receives an IP-fax needs to first return from the sleep mode, which is triggered by reception of a connection request packet of the IP-fax. The first image forming apparatus receives an IP-fax after returning from the sleep mode, checks the transfer-destination apparatus, and thereafter, transfers the IP-fax. Similarly, the second image forming apparatus which receives the transferred IP-fax returns from the sleep mode when receiving a transfer connection request packet.

In other words, an image forming apparatus which temporarily receives an IP-fax first returns from the sleep mode, and thereafter, begins the transfer process of the IP-fax. Only after that, the transfer-destination image forming apparatus receives the transfer data and returns from the sleep mode. Therefore, there is a time lag between the return from the sleep mode of the transfer-source image forming apparatus and that of the transfer-destination image forming apparatus.

In the technique of Japanese Patent Laid-Open No. 2009-504083 above, when the second apparatus is caused to return, the remote system sends an instruction in which a target is explicitly specified, to a relay agent. Thus, this technique is effective when a target is already definitely specified in the remote system. However, a case where a target is unknown in the sender as in the case of the above IP-fax reception and transfer (only the relay apparatus knows a party which is caused to return), is not taken into account. Also, the elapsed time until a target returns when the relay agent (relay apparatus) itself is in the sleep mode is not particularly taken into account. Specifically, in the case of the IP-fax reception and transfer, the presence of the above time lag between the return from the sleep mode of the transfer-source image forming apparatus and that of the transfer-destination image forming apparatus is not taken into account.

Therefore, the technique of Japanese Patent Laid-Open No. 2009-504083 above is effective when a target is already clearly known in the remote system, but cannot be used when a target is not known in the sender as in the case of the above IP-fax reception and transfer. Also, when a relay agent (relay apparatus) is in the sleep mode, then if the relay apparatus is caused to temporarily return and then instruct a target to return, it disadvantageously takes a long time to complete the start of the target.

SUMMARY OF THE INVENTION

According to one aspect of the present invention, there is provided a system comprising: an information processing apparatus configured to have a normal power supply mode and a power saving mode in which power consumption is less than in the normal power supply mode; and a network interface apparatus configured to connect the information processing apparatus and a network, wherein the network interface apparatus includes a return determination unit configured to determine whether or not the information processing apparatus needs to return to the normal power supply mode, in response to reception of a first packet related to a job through the network when the information processing apparatus is in the power saving mode, a cooperation determination unit configured to determine whether or not cooperation with another apparatus is needed in order to process the job related to the first packet if the return determination unit determines that the information processing apparatus needs to return to the normal power supply mode, a generation unit configured to generate a second packet for causing the another apparatus in the power saving mode to return to the normal power supply mode, and send the second packet to the another apparatus, if the cooperation determination unit determines that cooperation with another apparatus is needed, and a control unit configured to cause the information processing apparatus to return from the power saving mode to the normal power supply mode after the generation unit sends the second packet.

According to another aspect of the present invention, there is provided a network interface apparatus for connecting an information processing apparatus having a normal power supply mode and a power saving mode in which power consumption is less than in the normal power supply mode, and a network, comprising: a return determination unit configured to determine whether or not the information processing apparatus needs to return to the normal power supply mode, in response to reception of a first packet related to a job through the network when the information processing apparatus is in the power saving mode; a cooperation determination unit configured to determine whether or not cooperation with another apparatus is needed in order to process the job related to the first packet if the return determination unit determines that the information processing apparatus needs to return to the normal power supply mode; a generation unit configured to generate a second packet for causing the another apparatus in the power saving mode to return to the normal power supply mode, and send the second packet to the another apparatus, if the cooperation determination unit determines that cooperation with another apparatus is needed; and a control unit configured to cause the information processing apparatus to return from the power saving mode to the normal power supply mode after the generation unit sends the second packet.

According to another aspect of the present invention, there is provided a network interface apparatus for connecting an information processing apparatus having a normal power supply mode and a power saving mode in which power consumption is less than in the normal power supply mode, and a network, comprising: a generation unit configured to generate a second packet for causing another apparatus which processes a job in cooperation with the information processing apparatus, to return from the power saving mode to the normal power supply mode, and send the second packet to the another apparatus, in response to reception of a first packet related to the job through the network when the information processing apparatus is in the power saving mode; and a control unit configured to cause the information processing apparatus to return from the power saving mode to the normal power supply mode after the generation unit sends the second packet.

According to one aspect of the present invention, there is provided a method for controlling a system including an information processing apparatus having a normal power supply mode and a power saving mode in which power consumption is less than in the normal power supply mode, and a network interface apparatus for connecting the information processing apparatus and a network, wherein in the network interface apparatus, the method includes a return determination step of determining whether or not the information processing apparatus needs to return to the normal power supply mode, in response to reception of a first packet related to a job through the network when the information processing apparatus is in the power saving mode, a cooperation determination step of determining whether or not cooperation with another apparatus is needed in order to process the job related to the first packet if, in the return determination step, it is determined that the information processing apparatus needs to return to the normal power supply mode, a generation step of generating a second packet for causing the another apparatus in the power saving mode to return to the normal power supply mode, and sending the second packet to the another apparatus, if, in the cooperation determination step, it is determined that cooperation with another apparatus is needed, and a control unit step of causing the information processing apparatus to return from the power saving mode to the normal power supply mode after the second packet is sent in the generation step.

According to another aspect of the present invention, there is provided a method for controlling a network interface apparatus for connecting an information processing apparatus having a normal power supply mode and a power saving mode in which power consumption is less than in the normal power supply mode, and a network, the method comprising: a return determination step of determining whether or not the information processing apparatus needs to return to the normal power supply mode, in response to reception of a first packet related to a job through the network when the information processing apparatus is in the power saving mode; a cooperation determination step of determining whether or not cooperation with another apparatus is needed in order to process the job related to the first packet if, in the return determination step, it is determined that the information processing apparatus needs to return to the normal power supply mode; a generation step of generating a second packet for causing the another apparatus in the power saving mode to return to the normal power supply mode, and sending the second packet to the another apparatus, if, in the cooperation determination step, it is determined that cooperation with another apparatus is needed; and a control step of causing the information processing apparatus to return from the power saving mode to the normal power supply mode after the second packet is sent in the generation step.

According to another aspect of the present invention, there is provided a method for controlling a network interface apparatus for connecting an information processing apparatus having a normal power supply mode and a power saving mode in which power consumption is less than in the normal power supply mode, and a network, the method comprising: a generation step of generating a second packet for causing another apparatus which processes a job in cooperation with the information processing apparatus, to return from the power saving mode to the normal power supply mode, and sending the second packet to the another apparatus, in response to reception of a first packet related to the job through the network when the information processing apparatus is in the power saving mode; and a control step of causing the information processing apparatus to return from the power saving mode to the normal power supply mode after the second packet is sent in the generation step.

According to one aspect of the present invention, there is provided a non-transitory computer readable medium storing a program for causing a computer for connecting an information processing apparatus configured to have a normal power supply mode and a power saving mode in which power consumption is less than in the normal power supply mode, and a network, to function as: a return determination unit configured to determine whether or not the information processing apparatus needs to return to the normal power supply mode, in response to reception of a first packet related to a job through the network when the information processing apparatus is in the power saving mode; a cooperation determination unit configured to determine whether or not cooperation with another apparatus is needed in order to process the job related to the first packet if the return determination unit determines that the information processing apparatus needs to return to the normal power supply mode; a generation unit configured to generate a second packet for causing the another apparatus in the power saving mode to return to the normal power supply mode, and send the second packet to the another apparatus, if the cooperation determination unit determines that cooperation with another apparatus is needed; and a control unit configured to cause the information processing apparatus to return from the power saving mode to the normal power supply mode after the generation unit sends the second packet.

According to another aspect of the present invention, there is provided a non-transitory computer readable medium storing a program for causing a computer for connecting an information processing apparatus configured to have a normal power supply mode and a power saving mode in which power consumption is less than in the normal power supply mode, and a network, to function as: a generation unit configured to generate a second packet for causing another apparatus which processes a job in cooperation with the information processing apparatus, to return from the power saving mode to the normal power supply mode, and send the second packet to the another apparatus, in response to reception of a first packet related to the job through the network when the information processing apparatus is in the power saving mode; and a control unit configured to cause the information processing apparatus to return from the power saving mode to the normal power supply mode after the generation unit sends the second packet.

According to the present invention, when a plurality of apparatuses included in a system perform a job in cooperation with each other, the entire system is allowed to quickly return from the sleep mode, resulting in a reduction in the time it takes to complete the job process.

Further features of the present invention will become apparent from the following description of exemplary embodiments (with reference to the attached drawings).

BRIEF DESCRIPTION OF THE DRAWINGS

FIG. 5 is a diagram showing an example IP-fax transfer setting table which contains example job settings.

FIG. 6 is a diagram showing an example corresponding IP address table.

FIG. 7 is a diagram showing an example cooperation return pattern table.

FIG. 8 is a diagram an example printing job determination table.

DESCRIPTION OF THE EMBODIMENTS

Embodiments for carrying out the present invention will now be described with reference to the accompanying drawings. Although, in the embodiments below, an image forming system is described as an example of the information processing apparatus, the information processing apparatus may be any other apparatuses than image forming systems.

[System Configuration]

Figure 1:
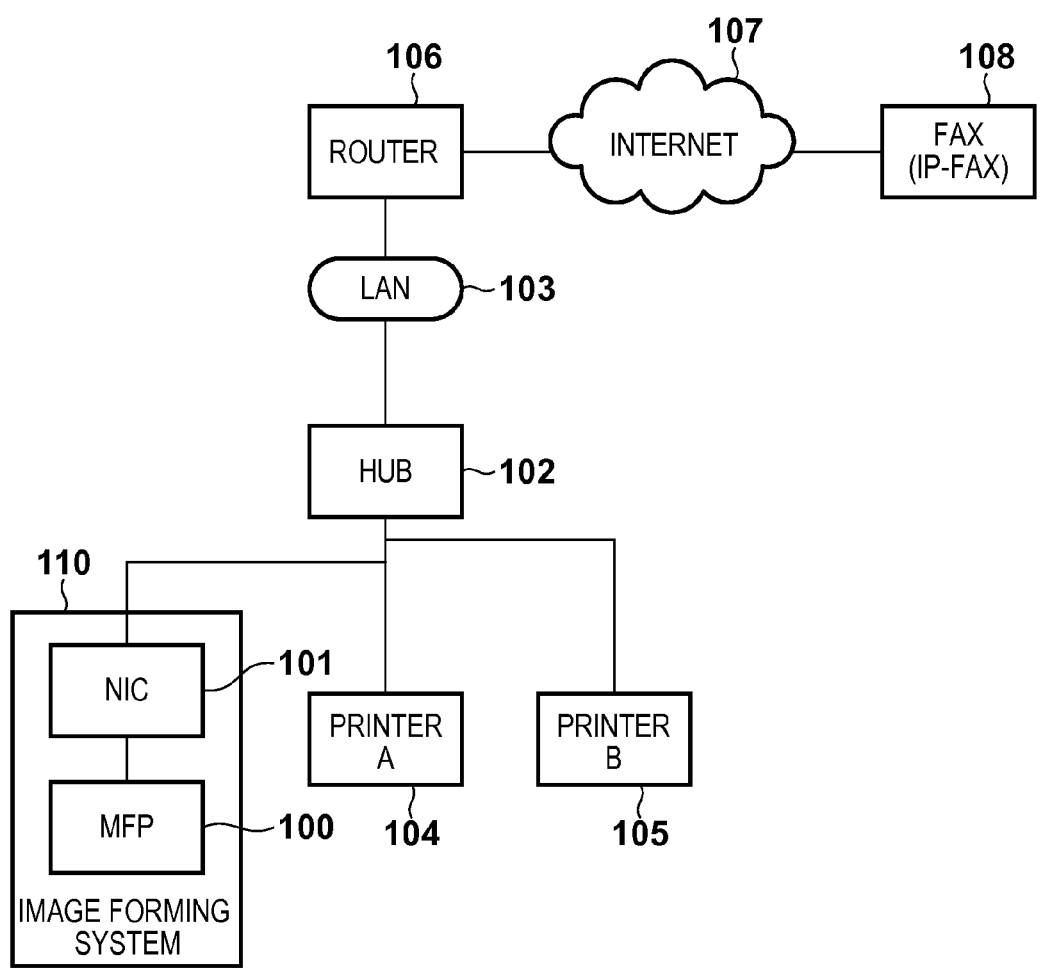
FIG. 1 is a block diagram showing an example configuration of a communication system.

FIG. 1 is a diagram showing an example entire configuration of a communication system including an image forming system according to this embodiment. In the communication system of FIG. 1, a communication apparatus (multifunction peripheral (MFP) 100) is connected to a HUB 102 through a network interface apparatus (NIC 101). The image forming system 110 includes the MFP 100 and the NIC 101. The HUB 102 is also connected to a local area network (LAN) 103. Note that, in addition to the NIC 101, a printer A 104 and a printer B 105 are connected to the HUB 102. The HUB 102 is a line concentration apparatus for Ethernet (registered trademark), etc.

A router 106 for connecting to an external network is connected to the LAN 103. The LAN 103 is connected to the Internet 107, which is an external network, through the router 106. There is a fax machine (IP-fax machine) 108 on the other side of the Internet 107. When the fax machine 108 sends a fax to the MFP 100, the fax data is received by the NIC 101, which is located in the internal network further inside than the HUB 102, through the Internet 107, the router 106, and the LAN 103. Thereafter, the MFP 100 performs a printing process on the received fax data.

[Hardware Configuration]

Figure 2:
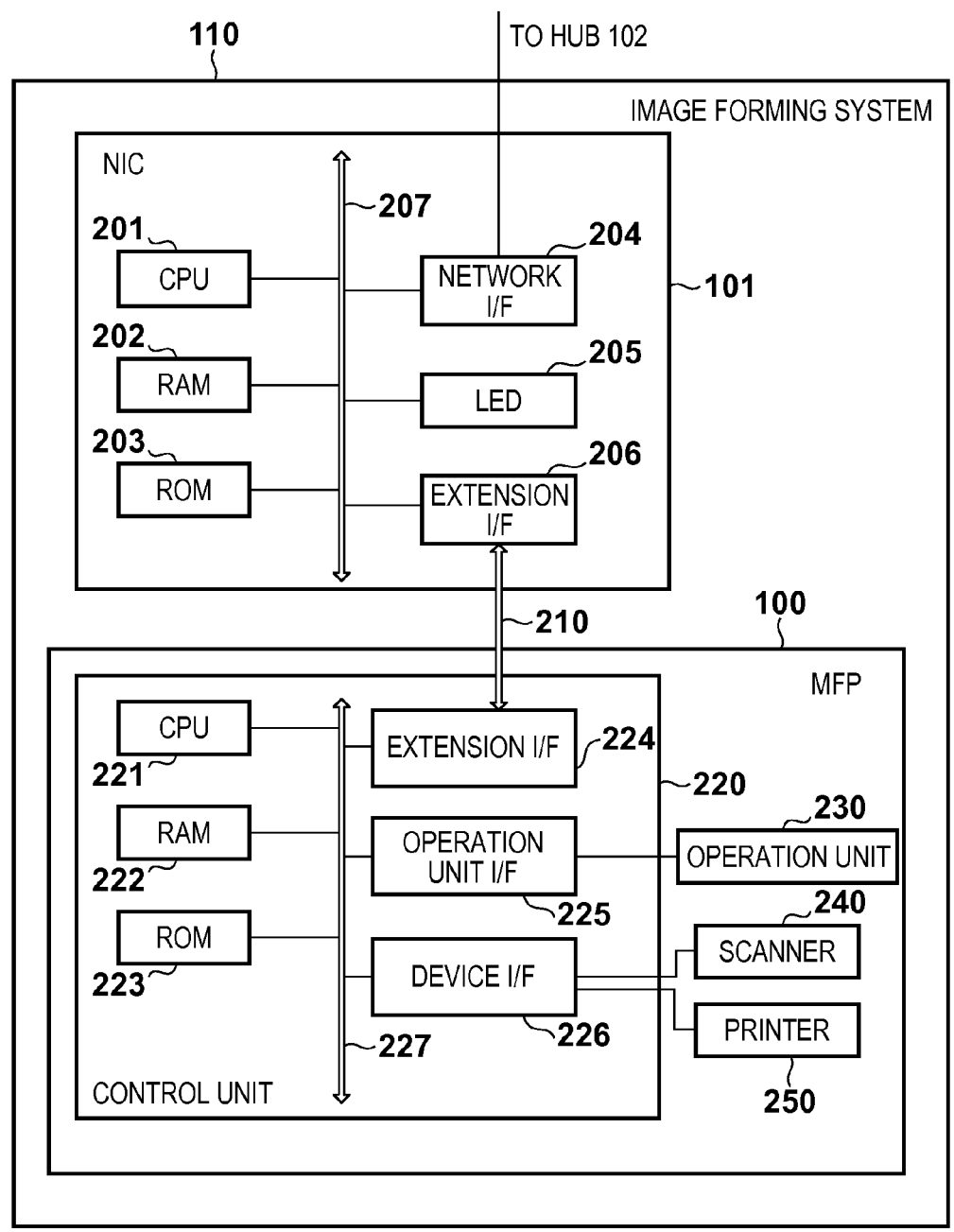
FIG. 2 is a block diagram showing an example configuration of an image forming system.

FIG. 2 is a block diagram for describing a configuration of the image forming system 110 including the MFP 100 and the NIC 101. The NIC 101 is a network interface apparatus which can be removably attached to the MFP 100 and is implemented as an intelligent network card module. The NIC 101 includes a CPU 201, a RAM 202, a ROM 203, a network I/F 204, an LED 205, an extension I/F 206, and a system bus 207 through which these components are connected.

The CPU 201 reads out a control program stored in the ROM 203, which is a storage unit, to perform various control processes. For example, the CPU 201 connects to the HUB 102 through the network I/F 204 connected to the system bus 207, and also performs a process of communicating with a terminal on the LAN 103 through the HUB 102 in accordance with a predetermined communication protocol. As a result, for example, the NIC 101 receives various items of data, such as print data, a printer control command, etc. which are sent from a print data generation apparatus on the LAN 103, and transfers the data to the MFP 100 through the extension I/F 206. Thereafter, the MFP 100 can perform a printing process using the various items of data obtained through the NIC 101.

The RAM 202 is used as a temporary storage area, such as a main memory, work area, etc., for the CPU 201. The LED 205 is used as a display unit for displaying an operating state of the NIC 101. The LED 205 may display, for example, various operating states such as an electrical connection state, communication mode, etc., between the network I/F 204 and the HUB 102, using the color or flickering pattern of the LED. The extension I/F 206 is an interface for connecting the NIC 101 and the MFP 100, and is connected to an extension I/F 224 of the MFP 100 through a local cable 210. Note that the extension I/F 206 includes a connector (not shown). The connector allows the NIC 101 to be removably attached to the MFP 100, and also allows the NIC 101 to be attached to other MFPs having the same configuration.

The MFP 100 includes a control unit 220, an operation unit 230, a scanner 240, and a printer 250. The control unit 220 includes a CPU 221, a RAM 222, a ROM 223, the extension I/F 224, an operation unit I/F 225, a device I/F 226, and a system bus 227 which connects these components.

The CPU 221 reads out a control program stored in the ROM 223 to perform various control processes. For example, the CPU 221 generates output image data based on print data transferred from the NIC 101 through the extension I/F 224, and outputs the output image data to the printer 250 through the device I/F 226. The RAM 222 functions as a main memory, work area, etc., for the CPU 221. The RAM 222 is also configured to be capable of expanding the memory capacity using an optional RAM which is connected to an expansion port (not shown).

The operation unit 230 includes buttons (not shown) for performing operations, such as setting an operation mode, etc., of the MFP 100, cancelling print data, etc., and a display unit (not shown), such as a liquid crystal panel, LED, etc., for displaying an operating state of the MFP 100. Also, a communication mode described below may be set through the operation unit 230.

The printer 250 is a printing apparatus which performs printing of image data using a known printing technique, such as electrophotography (laser printing), inkjet printing, dye sublimation printing (thermal transfer printing), etc. The scanner 240 reads an image on an original document to generate image data, and inputs the image data to the MFP 100. Note that the MFP 100 has a sleep mode (power saving mode) in which power consumption is less than in the standby mode (normal power supply mode). In the sleep mode, power is not supplied to all units except for particular units (the operation unit 230, the extension I/F 224, etc.), whereby power consumption is reduced.

[Software Configuration]

Figure 3:
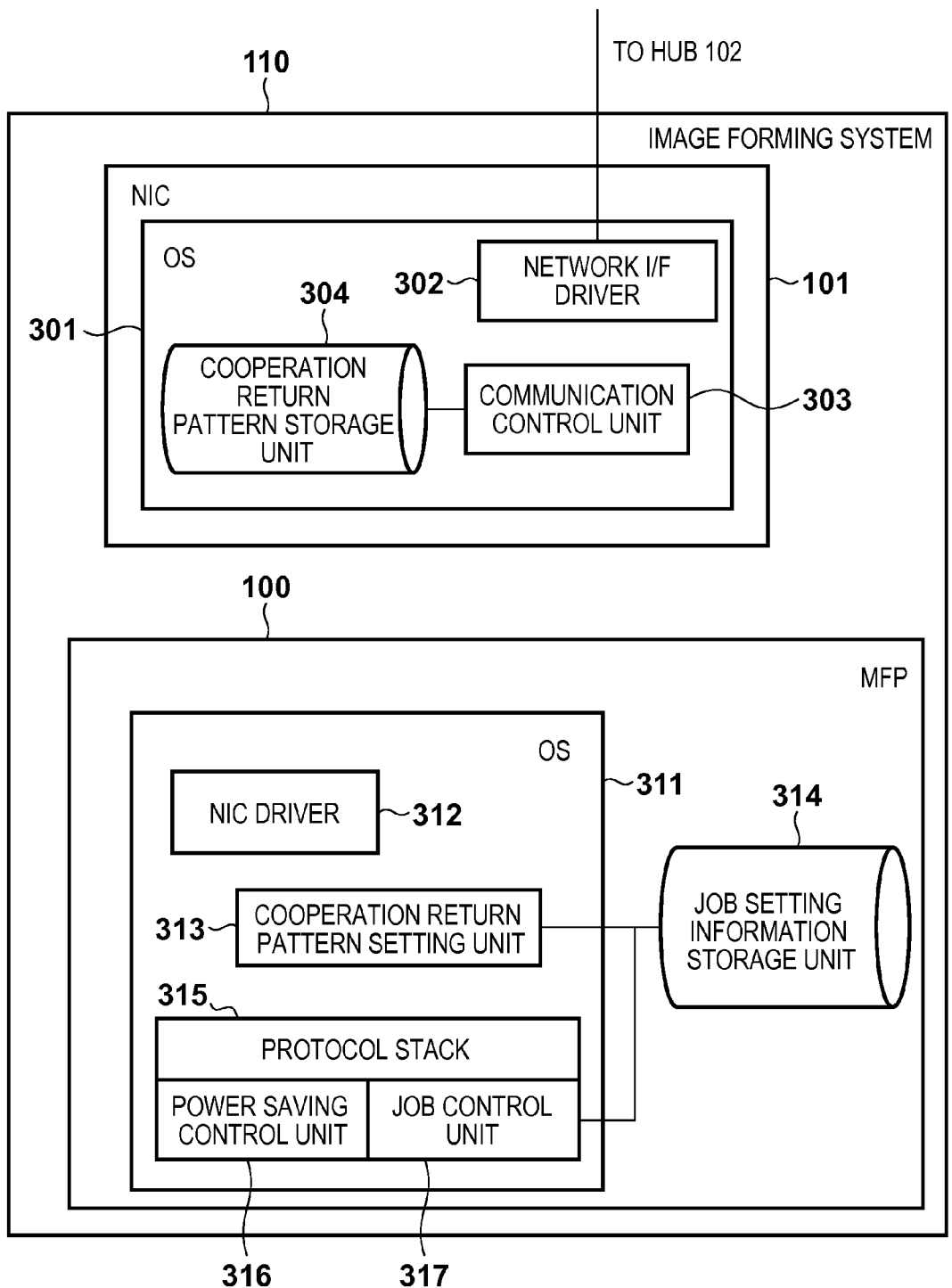
FIG. 3 is a block diagram showing an example software configuration of an NIC and an MFP.

FIG. 3 is a diagram showing an example software configuration of the NIC 101 and the MFP 100. Although, here, only software that is involved with a feature of the present invention is extracted and described, the NIC 101 and the MFP 100 may include various pieces of software other than the software described below.

Each piece of software of FIG. 3 is stored in a memory of the NIC 101 or the MFP 100, and is read into a RAM of the NIC 101 or the MFP 100 in response to the start of the apparatus, and is then executed by the CPU.

An operating system (OS) 301 of the NIC 101 includes a network I/F driver 302 and a communication control unit 303. The network I/F driver 302 controls execution of a communication process which is performed by the network I/F 204. The communication control unit 303 controls reception of a packet, generation of a packet to be sent, and sending of a packet in accordance with an instruction from the MFP 100 using a technique described below. The communication control unit 303 stores a cooperation return pattern specified by the MFP 100 in a cooperation return pattern storage unit 304 allocated in the RAM 202, and generates a packet to be sent for causing another apparatus which cooperates with the MFP 100 to return, by referring to the cooperation return pattern. The cooperation return pattern will be described in detail below.

On the other hand, an OS 311 of the MFP 100 includes an NIC driver 312 and a cooperation return pattern setting unit 313. The NIC driver 312 sends various instructions to the NIC 101 to cause the NIC 101 to perform various operations. The cooperation return pattern setting unit 313 determines a cooperation return pattern for, when its own apparatus (the MFP 100 itself) returns from the sleep mode, causing another apparatus to return from the sleep mode in cooperation with its own apparatus, by referring to a job setting information storage unit 314, using a technique described below. Thereafter, the cooperation return pattern setting unit 313 sets the determined cooperation return pattern in the NIC 101 through the NIC driver 312. The determined cooperation return pattern is stored in the cooperation return pattern storage unit 304 allocated in the RAM 202 of the NIC 101. Note that it is assumed that, of the pieces of software operating on the OS 311 of the MFP 100, the NIC driver 312 operates in a kernel space of the OS 311, while the cooperation return pattern setting unit 313 operates in a user space of the OS 311.

The job setting information storage unit 314 stores job setting information which specifies a process condition under which the MFP 100 should performs a job process, such as printing, faxing, etc. The job setting information is input by the user while viewing a display screen of the operation unit 230, and is stored in the ROM 223. An example of the job setting information will be described below with reference to FIG. 5.

A protocol stack 315 processes a communication packet in accordance with a specified protocol, and interprets a communication protocol, such as TCP/IP, etc., to perform a communication process. A protocol such as SIP, which is needed in communication of an IP-fax machine, is also processed by the protocol stack 315.

A power saving control unit 316 includes software which controls the MFP 100 so that the MFP 100 shifts to the sleep mode or returns to the standby state. The power saving control unit 316 monitors how the operation unit 230 of the MFP 100 is being used, or how a job control unit 317 is operating. When determining that the MFP 100 continues to be in the standby state, the power saving control unit 316 controls the MFP 100 so that the MFP 100 shifts to the sleep mode. When causing the MFP 100 to shift to the sleep mode, the power saving control unit 316 performs a control to stop the supply of power to all units except for particular units (the operation unit 230, the extension I/F 224, etc.), thereby reducing power consumption. Moreover, the power saving control unit 316 stops the CPU 221, and causes the RAM 222 to be in a low power state (self-refresh mode), and also performs a control to stop the pieces of software in the MFP 100. The power saving control unit 316 also performs a standby shift control to resume the supply of power to each unit when an interrupt occurs, such as when the NIC 101 causes a return interrupt in the sleep state, when a switch of the operation unit 230 is pressed down, etc.

The job control unit 317, when instructed by, for example, the operation unit 230 to do copying, etc., accepts a specified task (hereinafter referred to a job), and controls the scanner 240 or the printer 250 to perform the process. A print request or fax process request received by the NIC 101 is also transferred to the job control unit 317 through the protocol stack 315. The job control unit 317 interprets the details of a job, and controls the printer 250 so that the printer 250 performs a specified printing control, or transfers a fax in accordance with settings.

[Process Flow]

Figure 4:
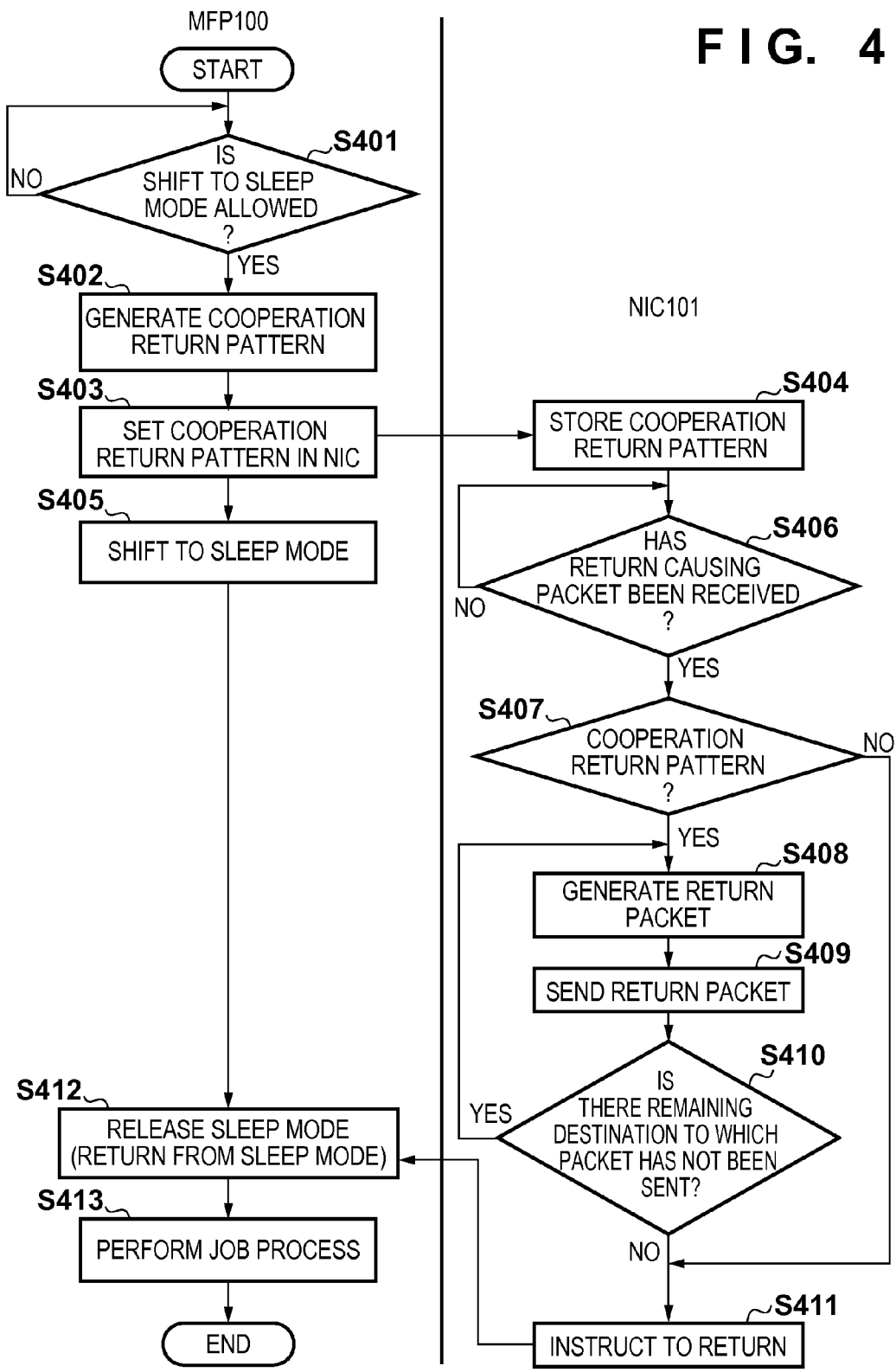
FIG. 4 is a flowchart showing a process flow of cooperation return determination and return packet sending.

FIG. 4 is a flowchart showing a process flow of shift to the sleep mode, and cooperation return determination and return packet sending in return from the sleep mode. Each process of the flowchart described below is implemented by a corresponding processing entity reading a program stored in a ROM, etc., which is a storage unit, and executing the program.

The MFP 100 uses the power saving control unit 316 to monitor whether or not a condition which allows the MFP 100 itself to shift to the sleep mode is satisfied, to determine whether or not to shift to the sleep mode as appropriate (step S401). If the condition which allows the MFP 100 to shift to the sleep mode is satisfied (YES in step S401), the MFP 100 sends, to the NIC 101, information for determining whether or not a job corresponding to a packet received in the sleep mode which causes return needs cooperation with another apparatus. Note that, in the description that follows, a packet received by the MPF 100 itself which causes return is referred to as a "return causing packet."

Specifically, the MFP 100 generates a cooperation return pattern which is a table indicating information for determining whether or not a return causing packet needs to cause another apparatus to return from the sleep mode, and information for generating a packet for causing another apparatus to return (step S402). Thereafter, the MFP 100 notifies the NIC 101 of the generated cooperation return pattern, which is then set in the NIC 101 (step S403). The generation of the cooperation return pattern and the setting of the generated cooperation return pattern in the NIC 101 will be described in detail below with reference to FIGS. 5-7.

The NIC 101 stores the cooperation return pattern received from the MFP 100 in the cooperation return pattern storage unit 304 (step S404). The power saving control unit 316 of the MFP 100 performs a sleep mode shift process (step S405). Specifically, the power saving control unit 316 performs a power control to stop the supply of power to the display unit of the operation unit 230, stop the power supply to the scanner 240 and the printer 250 of the MFP 100, etc. Moreover, the MFP 100 causes the RAM 222 to shift to a low power mode, and stops the CPU 221, thereby completing the shift to the sleep mode.

After the shift to the sleep mode, the power saving state is maintained until a sleep return causing event occurs. In the sleep mode state, the NIC 101 receives a packet which is intended to be sent to its own image forming system 110, and determines whether or not the packet requests its own apparatus to return from the sleep mode (step S406). Specifically, a packet externally received by the network I/F 204 of the NIC 101 is stored in the RAM 202 of the NIC 101, and the CPU 201 of the NIC 101 determines whether or not the received packet is a return causing packet. As an example of the determination, the NIC 101 determines whether or not the received packet is intended to be sent to its own apparatus, and whether or not its own apparatus cannot respond to or process the packet unless its own apparatus returns from the sleep mode. The return determination unit is implemented by the determination of this step.

When determining that a return causing packet has been received (YES in step S406), the NIC 101 determines whether or not the return causing packet corresponds to a cooperation return pattern, by referring to the cooperation return pattern storage unit 304 (step S407). A technique of determining whether or not the return causing packet corresponds to a cooperation return pattern will be described below with reference to FIG. 7. The cooperation determination unit is implemented by the determination of this step.

If the return causing packet does not correspond to a cooperation return pattern (NO in step S407), the NIC 101 notifies the MFP 100 of an interrupt through the extension I/F 206, and instructs the MFP 100 to return, in order to cause only its own apparatus to return (step S411).

If the return causing packet corresponds to a cooperation return pattern (YES in step S407), the NIC 101 generates a return packet for allowing another apparatus which cooperates with its own apparatus to return from the sleep mode in step S408. A technique of generating a return packet will be described below with reference to FIG. 7. Note that the return causing packet which causes the MFP 100 to return from the sleep mode is also herein referred to as a "first packet," and the return packet which the NIC 101 sends to another apparatus which cooperates with its own apparatus (the MFP 100) is also herein referred to as a "second packet." In step S409, the communication control unit 303 of the NIC 101 transfers the generated return packet to the network I/F driver 302, and instructs the network I/F driver 302 to send the return packet, thereby sending the return packet to another apparatus which should return. Thereafter, in step S410, the NIC 101 determines whether or not there is a remaining destination to which a return packet has not been sent, of destinations which are each another apparatus which should return. If the result of the determination is positive (YES in step S410), the NIC 101 generates a return packet again (step S408), and sends the return packet again (step S409), for a destination to which a return packet has not been sent.

When a return packet has been sent to all other apparatuses which should return (NO in step S410), the NIC 101 notifies the MFP 100 of an interrupt through the extension I/F 206, and instructs the MFP 100 to return, in order to cause its own apparatus (the MFP 100) to return, in step S411.

The MFP 100, when receiving the return instruction from the NIC 101 by an interrupt, releases the sleep mode (step S412). Specifically, when the MFP 100 receives an interrupt for a return instruction from the NIC 101, a power control circuit (not shown) resumes the supply of power to components of the control unit 220 of the MFP 100 to which power supply has not been stopped. As a result, the CPU 221 resumes operating. When the CPU 221 resumes operating, the RAM 222 returns from the low power mode to the normal mode, and the power saving control unit 316 performs a sleep return process.

Next, the NIC 101 transfers a return causing packet, and a packet which has subsequently been received by the NIC 101, to the MFP 100. The MFP 100 transfers the received packets to the job control unit 317 through the protocol stack 315. Thereafter, the job control unit 317 performs a job process corresponding to the contents of the received packets. The job control unit 317 analyzes the return causing packet, and a head portion of job data which is the contents of the packet subsequently received, to perform a job (step S413). If the job is to transfer an IP-fax, the MFP 100 transfers an IP-fax to another apparatus (e.g., the printer A 104 or the printer B 105 of FIG. 1) which cooperates with the MFP 100, and causes the apparatus to output the fax.

Thus, before causing one apparatus to return from the sleep mode, a return packet is sent to another apparatus which cooperates with the one apparatus, whereby both of the apparatuses are caused to return from the sleep mode substantially simultaneously. As a result, the time it takes for the entire system to return to the operating state for a cooperation job can be shortened.

(Generation and Setting of Cooperation Return Pattern)

Next, the generation of a cooperation return pattern (step S402) and the setting of a cooperation return pattern in the NIC 101 (step S403) will be further described with reference to FIGS. 5-7.

The cooperation return pattern setting unit 313 initially generates a cooperation return pattern for a job setting which needs cooperation return, based on information set in the job setting information storage unit 314. FIG. 5 is a diagram showing an example IP-fax transfer setting table set in the job setting information storage unit 314.

The IP-fax transfer setting table 500 includes setting information of IDs 501, caller telephone numbers 502, and transport telephone numbers 503. The ID 501 is an identifier (identification information) for uniquely identifying each IP-fax transfer setting, and is assigned a serial number beginning from "1" for each setting.

The caller telephone number 502 is the caller telephone number of an IP-fax. The transport telephone number 503 is the destination of an IP-fax received from the caller telephone number 502. In the case of the transfer setting of the ID "1" in the example of FIG. 5, it is indicated that an IP-fax received from the caller telephone number "050-123-4567" is transferred to the transport telephone number "050-987-6543."

In the example of FIG. 5, the ID "2" and the ID "3" have the same caller telephone number, and different transport telephone numbers. In such a setting, it is indicated that an IP-fax received from "050-456-7890" is transferred to two destinations "050-765-4321" and "050-432-1098."

The cooperation return pattern setting unit 313 refers to the IP-fax transfer setting table 500 of FIG. 5 to detect that a transfer setting is present, and next, refers to a corresponding IP address table 600 of FIG. 6 in order to generate a cooperation return pattern.

The corresponding IP address table of FIG. 6 is a table which stores IP addresses corresponding to the telephone numbers of the IP-fax transfer setting table 500 of FIG. 5. The corresponding IP address table 600 includes IDs 601, caller IP addresses 602, and transport IP addresses 603. The IDs 601 are the same set of identifiers as the IDs 501 of FIG. 5. The caller IP address 602 is an IP address corresponding to the caller telephone number 502. The transport IP address 603 is an IP address corresponding to the transport telephone number 503. A technique of obtaining an IP address corresponding to a telephone number is not a feature of the present invention and will not be described herein. An IP address may be previously set as setting information in the MFP 100, or may be obtained from a telephone number by inquiring an IP address resolution server (not shown).

The cooperation return pattern setting unit 313 refers to the corresponding IP address table 600 of FIG. 6 in order to generate a cooperation return pattern. Thereafter, the cooperation return pattern setting unit 313 generate a cooperation return pattern table which contains a pattern indicating what return packet is generated and sent to what destination, depending on what caller IP address a return causing packet is received from.

FIG. 7 is a diagram showing an example cooperation return pattern table 700. The cooperation return pattern table 700 includes IDs 701, and source IP addresses 702, destination port numbers 703, and protocol numbers 704 of a return causing packet. The cooperation return pattern table 700 also includes destination IP addresses 705, destination port numbers 706, and protocol numbers 707, which are needed in order to generate a return packet for another apparatus.

The ID 701 is an identifier for uniquely identifying each cooperation return pattern, and is assigned a serial number beginning from "1." The source IP address 702 of a return causing packet is a source IP address which is used to determine whether or not a return causing packet has been received from a source which needs cooperation return, and in which the caller IP address 602 in the corresponding IP address table 600 of FIG. 6 is set. The destination port number 703 of a return causing packet is used to determine whether or not a return causing packet has been received at a communication port which needs cooperation return.

When cooperation return is performed based on the IP-fax transfer setting, the port number used in communication of an IP-fax is set to "5060" because the session initiation protocol (SIP) is used during communication connection. The protocol number 704 of a return causing packet is used to determine whether or not a return causing packet has been received at a protocol number which needs cooperation return. In the example of FIG. 7, "17" is set so that, in communication of an IP-fax, when a pattern is such that a protocol number "17 (UDP)" is used, it is determined that cooperation return is needed. In the case of the cooperation return pattern of the ID number "1," the setting indicates that if the caller IP address of a return causing packet is "192.169.001.123," the destination port number is "5060," and the protocol number is "17," cooperation return is performed.

The destination IP address 705, the destination port number 706, and the protocol number 707 are used to generate a return packet for causing another apparatus which is a cooperating apparatus to return. The destination IP address 705 is set to have the value of the transport IP address 603 in the corresponding IP address table 600 of FIG. 6. The destination port number 706 is set based on the result of determination of whether or not there is a printing job which will be described below with reference to FIGS. 8 and 9 (whether or not printing is to be performed in a cooperating apparatus).

For example, when a cooperation return pattern is generated from an IP-fax transfer setting, the transfer-destination apparatus previously knows that a transferred IP-fax will be received and printed to paper. Therefore, it is necessary to send a return packet which can be used to determine the type of a job (here, a printing job) in order to cause the transfer-destination apparatus, particularly its printer unit, to return from the sleep mode. In other words, if the type of a job is known, a component for processing the job, of the apparatus, can be started with priority. Therefore, the destination port number is set to the value "9100" which is used in a printing job, unlike the communication port of SIP. The protocol number 707 is set to have a value which is specified in a generated return packet. For example, when a return causing packet which matches the cooperation return pattern of the ID "1" of the cooperation return pattern table 700 of FIG. 7 is received, a generated return packet has the following contents.

Destination IP address: 192.167.012.234
Destination port number: 9100
Protocol number: 17

Thus, the cooperation return pattern setting unit 313 generates the cooperation return pattern table of FIG. 7 based on the IP-fax transfer setting table 500 of FIG. 5 and the corresponding IP address table 600 of FIG. 6. Although the IP-fax transfer setting is herein described as an example, the cooperation return pattern table may be similarly generated by specifying the IP address of another apparatus which is needed for performing cooperation return based on the job setting for a cooperation job other than IP-faxing.

The cooperation return pattern table 700 thus generated by the cooperation return pattern setting unit 313 is transferred to the NIC driver 312 of the MFP 100, and the NIC driver 312 notifies the NIC 101 of the cooperation return pattern table 700. The NIC 101 stores the received cooperation return pattern table 700 in the cooperation return pattern storage unit 304 allocated in the RAM 202.

(Determination of Cooperation Return Pattern)

Next, the determination of whether or not a return causing packet corresponds to a cooperation return pattern (step S407) will be further described with reference to FIG. 7.

The communication control unit 303 of the NIC 101 determines whether or not the values of the three fields, i.e., the caller IP address, destination port number, and protocol number, of a return causing packet externally received by the network I/F driver 302 correspond to a cooperation return pattern. Specifically, the communication control unit 303 searches the cooperation return pattern table 700 stored in the cooperation return pattern storage unit 304 for a pattern which have equal values in all of the source IP address 702, destination port number 703, and protocol number 704. If there is a pattern which have equal values in all of the three fields, i.e., the caller IP address, destination port number, and protocol number, of a return causing packet, the communication control unit 303 determines that the return causing packet corresponds to a cooperation return pattern. If there is not a pattern which has equal values in all of the three fields, i.e., the caller IP address, destination port number, and protocol number, of a return causing packet in the cooperation return pattern table 700, the communication control unit 303 determines that it is not necessary to cause another apparatus to perform cooperation return.

(Generation of Return Packet)

Next, the generation of a return packet (step S408) will be further described with reference to FIG. 7. The communication control unit 303 of the NIC 101 allocates a memory for generation of a packet (packet buffer (not shown)) in the RAM 202. Thereafter, the communication control unit 303 writes the destination IP address 705, destination port number 706, and protocol number 707 of the ID of a cooperation return pattern of interest in the cooperation return pattern table 700, into the corresponding fields of the packet buffer. The setting of the destination port number of a return packet is performed in the MFP 100, and this process will be described in detail below with reference to FIGS. 8 and 9. The communication control unit 303 also sets suitable values in the other fields, such as the source IP address, etc. Thereafter, the communication control unit 303 transfers the generated return packet in the packet buffer to the network I/F driver 302, and instructs the network I/F driver 302 to send the return packet, thereby sending the return packet (step S409).

(Determination of Job and Determination of Destination Port Number)

Next, the determination of whether or not there is a printing job (printing is to be performed in a cooperating apparatus) and the determination of a destination port number will be described with reference to FIGS. 8 and 9.

FIG. 8 is a diagram showing an example printing job determination table. The printing job determination table 800 includes port numbers 801 of a return causing packet, and printing job determination results 802 for the port numbers. In an example of the printing job determination table 800 of FIG. 8, the printing job determination result is set to "No" when the port number of a return causing packet is "161," and "Yes" when the port number is "5060." This table is assumed to be previously stored together with a program in the ROM 223 of the MFP 100.

A process flow of determining whether or not there is a printing job (printing is to be performed in a cooperating apparatus) and the determination of a destination port number, by referring to the printing job determination table 800 of FIG. 8, will be described with reference to FIG. 9.

Figure 9:
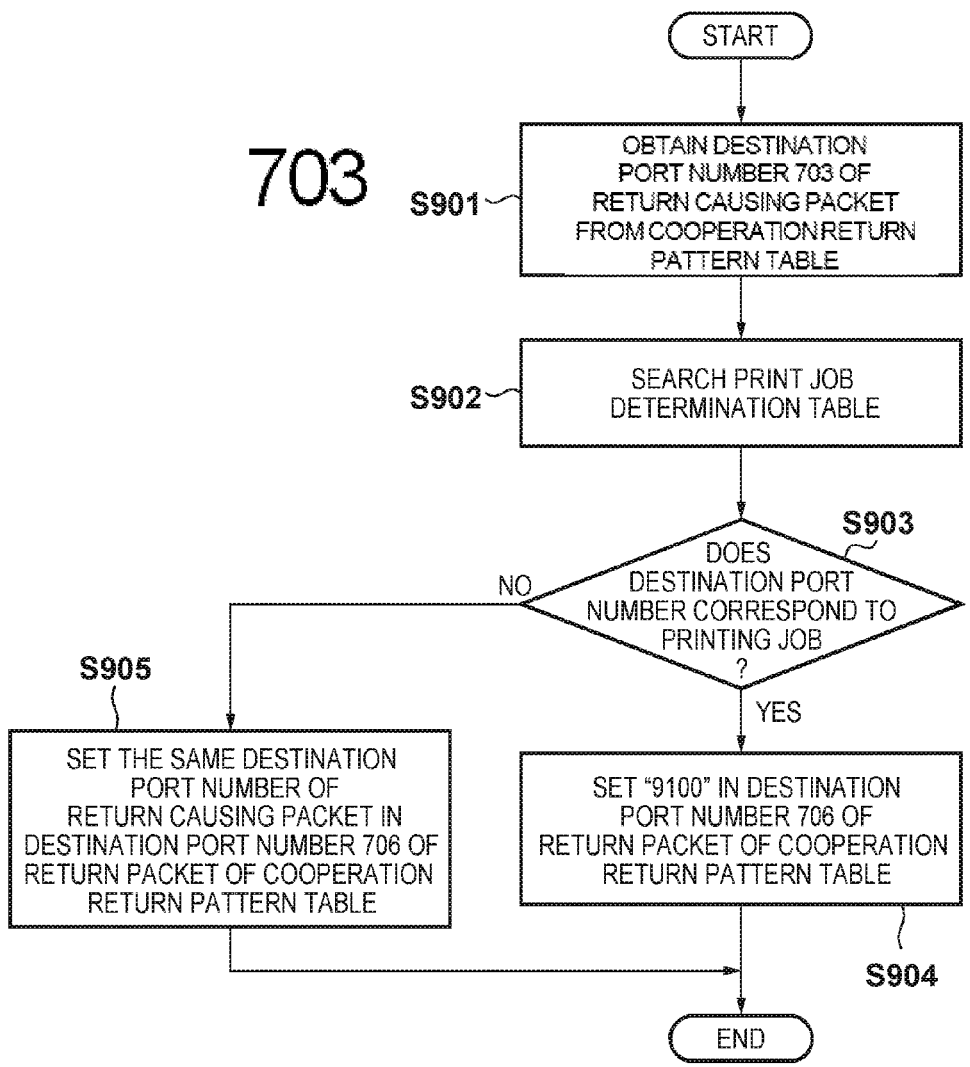
FIG. 9 is a flowchart showing a process flow of printing job determination and destination port number setting.

FIG. 9 is a flowchart showing a process flow of the printing job determination and the destination port number setting. The process of this flowchart is performed at the timing of determination of the destination port number 706 of a return packet during the generation of a cooperation return pattern of FIG. 4 (step S402).

The MFP 100 obtains the destination port number 703 of a return causing packet in the cooperation return pattern table 700 (step S901). The MFP 100 searches the printing job determination table 800 of FIG. 8 for a port number 801 which is equal to the obtained destination port number 703 of the return causing packet (step S902). The MFP 100 determines whether or not there is a printing job by referring to the value of the printing job determination result 802 corresponding to the port number of the printing job determination table 800 (step S903).

If there is a printing job (YES in step S903), the MFP 100 sets the value "9100" in the destination port number 706 of the cooperation return pattern table 700 (step S904). If there is not a printing job (NO in step S903), the MFP 100 sets the source port number of the return causing packet directly in the destination port number 706 (step S905). The port number "9100" is frequently used when a printing job is requested. Another apparatus which has received a return packet having this specific port number can determine that there is a job involved with printing.

Thus, not only the control unit but also the printer unit simultaneously return from the sleep mode, and therefore, printing can be more quickly started after return from the sleep mode. Conversely, if it is not necessary to cause even the printer unit of another apparatus which is a cooperating apparatus to return for power saving purposes, the destination port number of a return causing packet is directly set in the destination port number of a return packet before the return packet is sent.

Thus, by changing the destination port number of a return packet for causing another apparatus which is a cooperating apparatus, depending on whether or not there is a job involved with printing, another apparatus which is a cooperating apparatus, particularly its printer unit, can also be caused to more quickly return from the sleep mode. Although, in this embodiment, an example corresponding to a printing job has been described, a table similar to FIG. 8 may be provided which corresponds to another job, and information for causing return from the sleep mode (here, a port number) may be provided to another apparatus.

As described above, according to the present invention, when a plurality of apparatuses perform a job in cooperation with each other, the entire system can be caused to more quickly return from the sleep mode, resulting in a reduction in the time it takes to complete a job process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-273164, filed Dec. 27, 2013, which is hereby incorporated by reference herein in its entirety.

What is claimed is:

1. A system comprising:
    an information processing apparatus configured to have a normal power supply mode and a power saving mode in which power consumption is less than in the normal power supply mode; and
    a network interface apparatus configured to connect the information processing apparatus and a network,
    wherein the network interface apparatus includes
        a return determination unit configured to determine whether or not the information processing apparatus needs to return to the normal power supply mode, in response to reception, through the network of a first packet related to a job when the information processing apparatus is in the power saving mode,
        a cooperation determination unit configured to determine whether or not cooperation with another apparatus is needed in order to process the job related to the first packet, if the return determination unit determines that the information processing apparatus needs to return to the normal power supply mode,
        a generation unit configured to generate a second packet for causing the another apparatus to return from the power saving mode to the normal power supply mode and to send the second packet to the another apparatus, if the cooperation determination unit determines that cooperation with another apparatus is needed, and
        a control unit configured to cause the information processing apparatus to return from the power saving mode to the normal power supply mode after the generation unit sends the second packet.

2. The system according to claim 1, wherein the information processing apparatus further includes
    a setting unit configured to set information of another apparatus which cooperates with the information processing apparatus in order to process the job related to the first packet, with respect to the network interface apparatus.

3. The system according to claim 2, wherein the setting unit performs the setting before the information processing apparatus switches from the normal power supply mode to the power saving mode.

4. The system according to claim 2, wherein the setting unit further sets information about a part to be started, of parts stopped in the power saving mode, in the another apparatus which cooperates with the information processing apparatus in order to process the job related to the first packet.

5. The system according to claim 4, wherein the generation unit generates and sends the second packet including the information about a part to be started, based on the information set in the setting unit.

6. The system according to claim 4, wherein the information about a part to be started is set in a port number corresponding to the job related to the first packet.

7. The system according to claim 1, wherein the network interface apparatus further includes
    a storage unit configured to store, in associated with each other, information about a source of the first packet and information about another apparatus which cooperates with the information processing apparatus in order to process the job related to the first packet.

8. The system according to claim 7, wherein the storage unit performs the association using an IP address, a port number, and a protocol number.

9. The system according to claim 1, wherein in the information processing apparatus and the another apparatus, in the power saving mode, power is not supplied to a part needed for processing the job related to the first packet.

10. The system according to claim 1, wherein the another apparatus includes a plurality of apparatuses, and
    wherein the generation unit sends the second packet to the plurality of apparatuses.

11. A network interface apparatus for connecting an information processing apparatus, the information processing apparatus having a normal power supply mode and a power saving mode in which power consumption is less than in the normal power supply mode, and a network, the network interface apparatus comprising:
    a return determination unit configured to determine whether or not the information processing apparatus needs to return to the normal power supply mode, in response to reception, through the network, of a first packet related to a job when the information processing apparatus is in the power saving mode;
    a cooperation determination unit configured to determine whether or not cooperation with another apparatus is needed in order to process the job related to the first packet if the return determination unit determines that the information processing apparatus needs to return to the normal power supply mode;
    a generation unit configured to generate a second packet for causing the another apparatus to return from the power saving mode to the normal power supply mode, and to send the second packet to the another apparatus, if the cooperation determination unit determines that cooperation with another apparatus is needed; and
    a control unit configured to cause the information processing apparatus to return from the power saving mode to the normal power supply mode after the generation unit sends the second packet.

12. A network interface apparatus for connecting an information processing apparatus, the information processing apparatus having a normal power supply mode and a power saving mode in which power consumption is less than in the normal power supply mode, and a network, the network interface apparatus comprising:
  a generation unit configured to, in response to reception, through the network, of a first packet related to a job when the information processing apparatus is in the power saving mode, generate a second packet for causing another apparatus which processes the job in cooperation with the information processing apparatus to return from the power saving mode to the normal power supply mode, and to send the second packet to the another apparatus; and
  a control unit configured to cause the information processing apparatus to return from the power saving mode to the normal power supply mode after the generation unit sends the second packet.

13. A method for controlling a system including an information processing apparatus, the information processing apparatus having a normal power supply mode and a power saving mode in which power consumption is less than in the normal power supply mode, and a network interface apparatus for connecting the information processing apparatus and a network,
  wherein the method is performed by the network interface apparatus, and
  wherein the method includes
    a return determination step of determining whether or not the information processing apparatus needs to return to the normal power supply mode, in response to reception, through the network, of a first packet related to a job when the information processing apparatus is in the power saving mode,
    a cooperation determination step of determining whether or not cooperation with another apparatus is needed in order to process the job related to the first packet if, in the return determination step, it is determined that the information processing apparatus needs to return to the normal power supply mode,
    a generation step of generating a second packet for causing the another apparatus to return from the power saving mode to the normal power supply mode, and sending the second packet to the another apparatus, if, in the cooperation determination step, it is determined that cooperation with another apparatus is needed, and
    a control unit step of causing the information processing apparatus to return from the power saving mode to the normal power supply mode after the second packet is sent in the generation step.

14. A method for controlling a network interface apparatus for connecting an information processing apparatus, the information processing apparatus having a normal power supply mode and a power saving mode in which power consumption is less than in the normal power supply mode, and a network, the method comprising:
  a return determination step of determining whether or not the information processing apparatus needs to return to the normal power supply mode, in response to reception, through the network, of a first packet related to a job when the information processing apparatus is in the power saving mode;
  a cooperation determination step of determining whether or not cooperation with another apparatus is needed in order to process the job related to the first packet if, in the return determination step, it is determined that the information processing apparatus needs to return to the normal power supply mode;
  a generation step of generating a second packet for causing the another apparatus to return from the power saving mode to the normal power supply mode, and sending the second packet to the another apparatus, if, in the cooperation determination step, it is determined that cooperation with another apparatus is needed; and
  a control step of causing the information processing apparatus to return from the power saving mode to the normal power supply mode after the second packet is sent in the generation step.

15. A method for controlling a network interface apparatus for connecting an information processing apparatus, the information processing apparatus having a normal power supply mode and a power saving mode in which power consumption is less than in the normal power supply mode, and a network, the method comprising:
  a generation step of, in response to reception, through the network, of a first packet related to a job when the information processing apparatus is in the power saving mode, generating a second packet for causing another apparatus which processes the job in cooperation with the information processing apparatus, to return from the power saving mode to the normal power supply mode, and sending the second packet to the another apparatus; and
  a control step of causing the information processing apparatus to return from the power saving mode to the normal power supply mode after the second packet is sent in the generation step.

16. A non-transitory computer readable medium storing a program for causing a computer for connecting an information processing apparatus, the information processing apparatus being configured to have a normal power supply mode and a power saving mode in which power consumption is less than in the normal power supply mode, and a network, to function as:
  a return determination unit configured to determine whether or not the information processing apparatus needs to return to the normal power supply mode, in response to reception, through the network, of a first packet related to a job when the information processing apparatus is in the power saving mode;
  a cooperation determination unit configured to determine whether or not cooperation with another apparatus is needed in order to process the job related to the first packet if the return determination unit determines that the information processing apparatus needs to return to the normal power supply mode;
  a generation unit configured to generate a second packet for causing the another apparatus to return from the power saving mode to the normal power supply mode, and to send the second packet to the another apparatus, if the cooperation determination unit determines that cooperation with another apparatus is needed; and
  a control unit configured to cause the information processing apparatus to return from the power saving mode to the normal power supply mode after the generation unit sends the second packet.

17. A non-transitory computer readable medium storing a program for causing a computer for connecting an information processing apparatus, the information processing apparatus being configured to have a normal power supply mode and a power saving mode in which power consumption is less than in the normal power supply mode, and a network, to function as:
- a generation unit configured to, in response to reception, through the network, of a first packet related to a job when the information processing apparatus is in the power saving mode, generate a second packet for causing another apparatus which processes the job in cooperation with the information processing apparatus, to return from the power saving mode to the normal power supply mode, and to send the second packet to the another apparatus; and
- a control unit configured to cause the information processing apparatus to return from the power saving mode to the normal power supply mode after the generation unit sends the second packet.

* * * * *